United States Patent [19]

Charbonnier

[11] Patent Number: 4,809,826
[45] Date of Patent: Mar. 7, 1989

[54] DRUM BRAKE WITH AUTOMATIC ADJUSTMENT

[75] Inventor: Jacques Charbonnier, Clichy, France
[73] Assignee: Bendix France, Drancy, France
[21] Appl. No.: 142,389
[22] Filed: Jan. 11, 1988

[30] Foreign Application Priority Data

Jan. 29, 1987 [FR] France .................. 87 01045

[51] Int. Cl.⁴ .............. F16D 51/00; F16D 51/24; F16D 65/62
[52] U.S. Cl. .............. 188/79.52; 188/196 B; 188/79.56; 192/111 A
[58] Field of Search .......... 188/196 A, 325-343, 188/79.51-79.64; 192/111 A

[56] References Cited

U.S. PATENT DOCUMENTS

| | | | |
|---|---|---|---|
| 2,875,860 | 3/1959 | Eckardt et al. | 188/196 P X |
| 3,339,678 | 9/1967 | Burnett | 188/79.5 |
| 3,983,970 | 10/1976 | Courbot | 188/79.5 |
| 4,039,055 | 8/1977 | Meyer et al. | 188/79.56 |
| 4,148,380 | 4/1979 | Haraikawa | 192/111 A |
| 4,385,681 | 5/1983 | Conrad et al. | 192/111 A X |
| 4,476,963 | 10/1984 | Palmer et al. | 188/196 BA X |
| 4,533,024 | 8/1985 | Rath | 188/196 BA X |
| 4,646,881 | 3/1987 | Denree et al. | 188/196 BA X |
| 4,706,783 | 11/1987 | Rath et al. | 188/196 BA X |
| 4,706,784 | 11/1987 | Shellhouse | 188/196 BA X |
| 4,729,457 | 3/1988 | Cousin et al. | 188/79.52 |

FOREIGN PATENT DOCUMENTS 1419377 10/1965 France .
2285545 4/1976 France .
549914 12/1942 United Kingdom .
1507550 4/1978 United Kingdom .

*Primary Examiner*—Douglas C. Butler
*Attorney, Agent, or Firm*—Larry J. Palguta; Ken C. Decker

[57] ABSTRACT

The automatic adjustment of a drum brake is obtained by way of an adjusting lever (30) fitted to pivot on one (12) of the brake shoes when the wear of the friction linings (16) on the brake shoes (12) warrants it. This lever rests against a spacer (44) connecting the ends of the brake shoes between which the brake motor is located, such that the position of the lever (30) determines the distance apart in the rest position between these two ends when this motor is not actuated. Two surfaces opposite one another (48, 50) formed respectively on the spacer (44) and on the lever (30) define an operating clearance between them beyond which an adjustment is made when the brake is actuated. A lug (56) on a bimetal strip (52) takes up the space between the surface (48, 50) in order that an inadvertent adjustment does not occur due to an overheating of the brake drum when the temperature exceeds a certain threshold, thus increasing the operating clearance.

9 Claims, 2 Drawing Sheets

DRUM BRAKE WITH AUTOMATIC ADJUSTMENT

DESCRIPTION

The invention relates to a drum brake fitted with an automatic adjustment device taking into account the wear of the brake friction linings in order that the travel of the brake motor remains practically unchanged in spite of this wear. Such a brake may be used equally on a private car or on a heavy goods vehicle.

In more precise terms, the invention relates to a drum brake such as that which is described in the document FR-A-1 419 377. This drum brake includes a backplate on which two brake shoes having friction linings are slideably mounted. These linings are capable of being brought in friction engagement against a rotating drum by a brake motor inserted between the two adjacent ends of the brake shoes. An adjusting lever is hinged by one of its ends on a first of the brake shoes, near the brake motor, and it has a toothed sector at its opposite end. A ratchet mounted on this same brake shoe is meshed with the toothed sector formed at the end of the adjusting lever under the action of a torsion spring.

The brake drum described in the above document FR-A-1 419 377 comprises in addition a spacer inserted between the brake shoes near the brake motor and a spring acting on the ends of the brake shoes towards the spacer, so as to bring the adjusting lever to rest against the latter when the brake motor is not actuated. Thus a distance apart in the rest position between the aforementioned ends of the brake shoes is defined. The interaction of the ratchet with the toothed sector formed at the end of the adjusting lever is such that only a rotation of the latter in the direction tending to increase this distance apart in the rest position is authorized. In order to control this rotation of the adjusting lever when the wear of the friction linings makes an increase of this distance apart in the rest position necessary, the spacer and the adjusting lever have two surfaces opposite one another separated by a space defining a certain clearance between them when the brake motor is not actuated, these surfaces being arranged so as to be able to rest one against the other to control the rotation of the adjusting lever when the motor is actuated.

In a brake of this type, the distance separating the ends of the brake shoes, between which the brake motor is located when the latter is not actuated, is increased automatically when the operating travel of the brake motor required to apply the friction linings against the drum exceeds a certain value. An automatic compensation for wear of the friction linings is thus obtained.

However, in the absence of any particular arrangements, the distance separating the ends of the brake shoes in the rest position between which the brake motor is located is also increased automatically when the increase in the operating travel of the brake motor results from considerable overheating. In fact, the expansion of the drum is such that the increase in the operating travel of the brake motor leads to a pivoting of the adjusting lever, with the result that an inadvertent opening out of the brake shoes could lead to the risk of a locking-up of the brake when its temperature returns to normal.

The precise subject of the invention is a drum brake of the type described earlier, this brake being equipped with appropriate means permitting the prevention of an overheating leading to an increase in the distance separating the ends of the brake shoes between which the brake motor is located in the rest position.

According to the invention, this result is obtained due to a drum brake with automatic adjustment having a backplate on which two brake shoes are slideably mounted comprising friction linings capable of being brought into friction engagement with a rotating drum by a brake motor inserted between two adjacent ends of the brake shoes, an adjusting lever one end of which is hinged on the said end of a first of the brake shoes, a spacer inserted between the brake shoes near the brake motor, a resilient means acting on the ends of the brake shoes towards the spacer so as to bring the adjusting lever to rest against the latter when the brake motor is not actuated, to define a distance apart between the said ends of the brake shoes in the rest position, a unidirectional means of engagement mounted on the first brake shoe and coupled to the other end of the adjusting lever, so as to permit a rotation of the latter only in a direction tending to increase this distance apart in the rest position, the spacer and the adjusting lever having two surfaces opposite one another separated by a space defining an operating clearance when the brake motor is not actuated, these surfaces being arranged so as to be able to come to rest one against the other to control the rotation of the adjusting lever in the said direction when the motor is actuated, characterized in that a moving lug carried by a member sensitive to temperature is placed in the said space to give a reduced value to the operating clearance when the temperature is less than a given temperature threshold, the member sensitive to temperature moving away the moving lug out of the said space when the temperature is more than this threshold, to give a maximum value to the operating clearance.

In the perfected drum brake so described, the reduced value of clearance existing between the surfaces of the spacer and of the adjusting lever opposite one another when the temperature is less than a certain threshold enables automatic adjustment of the brake to be ensured when the wear of the friction linings demands it. On the other hand, the much greater value given to this clearance for temperatures above the aforementioned threshold enables the intervention of an inadvertent adjustment following an overheating of the brake to be avoided.

Preferably, the element sensitive to the temperature is a bimetal strip, this bimetal strip may be fixed particularly by a first end on the spacer and carry the lug at its other end.

According to a first embodiment of the invention, the moving lug has a uniform thickness, such that the reduced value of clearance is constant when this lug is placed in the space between the surfaces of the spacer and of the lever facing one another.

On the contrary, according to another embodiment of the invention, the moving lug has a varying thickness, such that the reduced value of the clearance increases with the temperature when this lug is placed in the space.

In this last embodiment of the invention, the thickness of the moving lug may be defined particularly between two flat intersecting faces, such that the reduced value of the clearance increases progressively with the temperature, when this is less than the threshold.

Different embodiments of the invention will now be described, as non-limiting examples, with reference to the accompanying drawings, in which.

Figure 1:
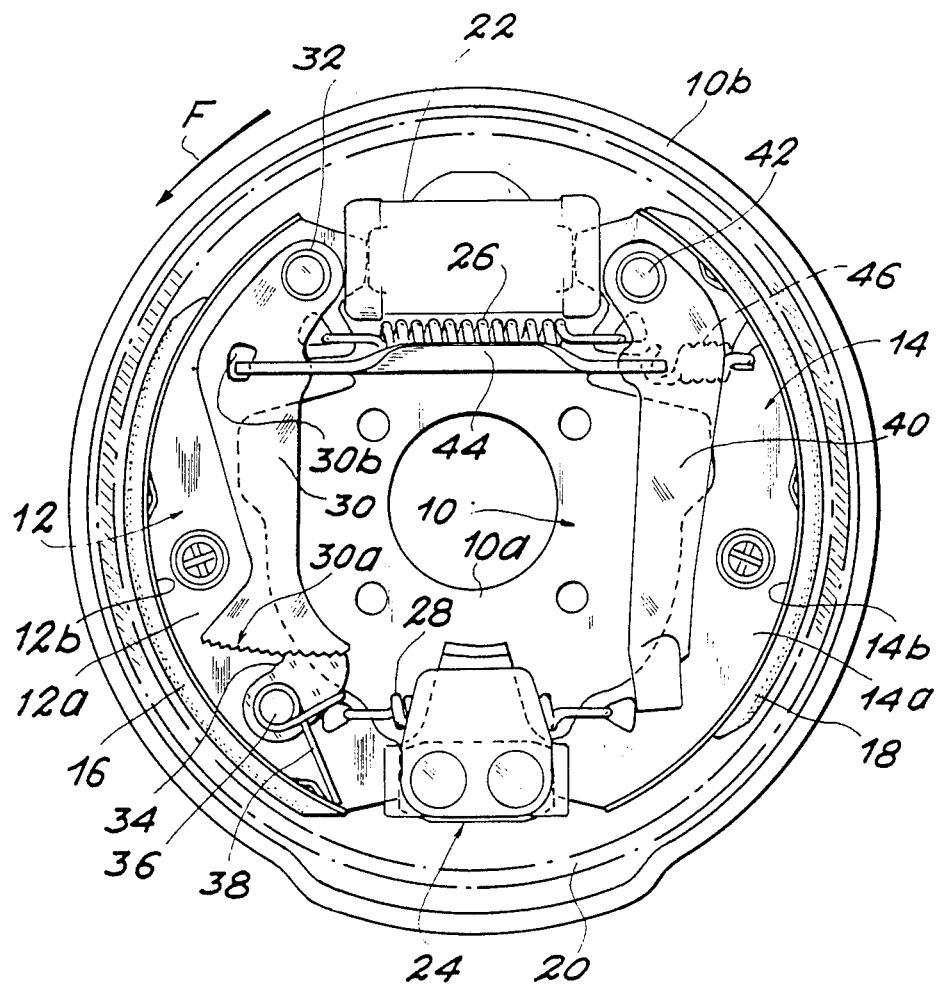
FIG. 1 is a plan view of a drum brake according to the invention.

The drum brake shown in FIG. 1 has a backplate 10 comprising a disc 10a approximately flat, prolonged by a circular ring 10b on its periphery. This backplate 10 is designed so as to be fastened to a fixed part of the vehicle such as an axle flange.

Two brake shoes 12 and 14 are slideably carried by the backplate disc 10a, due to conventional mechanisms (not shown). As is well known, each of the brake shoes 12 and 14 comprises a web 12a, 14a approximately flat on which a rim 12b, 14b is fixed in the form of an arc of a circle carrying a friction lining 16 and 18 respectively on its outer face.

The brake shoes 12 and 14 are placed on the backplate 10 in such a way that the outer coverings of the brake linings 16 and 18 are located on the same circumference the axis of which is merged with the axis of the backplate 10. Thus, the brake linings 16 and 18 are able to come into contact with the inner surface of a brake drum 20 covering the two brake shoes and shown chain-dotted in FIG. 1. The drum 20 is mounted concentrically inside the ring 10b and it is fixed to a rotating part such as a vehicle wheel.

A brake motor, hydraulically controlled, is fixed to the backplate disc 10a, between two adjacent first ends of the brake shoes 12 and 14. This brake motor 22 is fitted with two pistons (not shown) working in opposition in order to exert a thrust on the corresponding end of the web 12a, 14a of each of the brake shoes, when the motor is actuated.

An anchoring block 24, also fixed to the backplate disc 10a, is placed between the other two adjacent ends of the brake shoes 12 and 14, in such a way that the corresponding ends of the webs 12a and 14a of these brake shoes are normally resting against this block.

A traction spring 26 is inserted between the ends of the webs of the brake shoes between which the brake motor 22 is located, very close to the latter, to bring these ends closer together when the motor is not actuated. In similar fashion, the two other ends of brake shoes 12 and 14 are held against the anchoring block 24 by means of a traction spring 28 inserted between the corresponding ends of the webs of the brake shoes, very close to this block.

Supposing that the brake drum 20 rotates in the direction of the arrow F in FIG. 1 when the vehicle moves in a forward direction, the brake shoes 12 and 14 may be distinguished by the fact that the brake shoe 12 rests on the anchoring block 24 when it is in friction contact with the drum, whereas the brake shoe 14 rests on the brake motor 22 in the same conditions. The brake shoes 12 and 14 are called respectively the "leading brake shoe" and the "trailing brake shoe" to take this difference into account.

One of the ends of an adjusting lever 30 is mounted to pivot on a pin 32 on the end of the web of the leading brake shoe 12 which rests against the brake motor 22. The opposite end of the adjusting lever 30 carries a toothed sector 30a centered on the pivot pin 32.

A ratchet 34 is also fitted to pivot on a pin 36 on the web of the leading brake shoe 12, opposite toothed sector 30a. A torsion spring 38, mounted on the pin 36, keeps the teeth of the ratchet 34 up against the teeth of toothed sector 30a. The interaction between the ratchet 34 and the toothed sector 30a is such that it is possible to make the adjusting lever 30 pivot anti-clockwise on its pin 32 when considering FIG. 1, whereas a pivoting of the lever 30 in the opposite direction is impossible.

In the example of embodiment shown in FIG. 1, a handbrake lever 40 is mounted so as to pivot on the end of the web of the trailing brake shoe 14 by one of its ends adjacent to the brake motor 22, via a pin 42.

In known manner, the other end of the handbrake lever 40 is designed to be fixed to the end of a manually controlled cable (not shown).

The drum brake shown in FIG. 1 comprises in addition a spacer 44 arranged between the brake shoes 12 and 14, near the brake motor 22, approximately parallel to the axis of the latter. This spacer 44 is made up of a plate having two notches at its ends. The web of the leading brake shoe 12 and the adjusting lever 30 just locate in one 44a of these notches (FIGS. 2 and 3), whereas the web of the trailing brake shoe 14 and the handbrake lever 40 just locate in the other notch. Setbacks formed level with the spacer 44 on the inside edge of each of the brake shoes 12 and 14 enable the spacer to be held in position.

The spacer 44 determines the minimum distance apart separating the ends of the brake shoes between which the brake motor 22 is located, when the latter is released. In fact, the spring 26 keeps the adjusting lever 30 and the handbrake lever 40 in the bottom of the notches made in the ends of the spacer 44, when the brake motor 22 is not actuated. For this purpose, the inside edges of the levers 30 and 40 are always protruding in relation to the inside edges of the webs 12a and 14a of the brake shoes which carry them level with the spacer 44.

A pivoting of the adjusting lever 30 in an anticlockwise direction (FIG. 1) thus tends, in the rest position, to increase the distance separating the ends of the brake shoes between which the motor 22 is located. In controlling such a pivoting when the wear of the brake linings 16 and 18 makes it necessary, this wear is thus automatically compensated for.

the pivoting of the lever 30 is controlled by the spacer 44 when the brake motor 22 is actuated and when a brake adjustment is necessary. For this purpose, a traction spring 46 is inserted between the rim 14b of the trailing brake shoe and the end of the spacer 44 adjacent to this brake shoe, so that the spacer moves with the trailing shoe 14 when the brake motor 22 is actuated. A relative movement is then produced between the opposite end of the spacer 44 and the adjusting lever 30 carried on the leading brake shoe 12.

Figure 2:
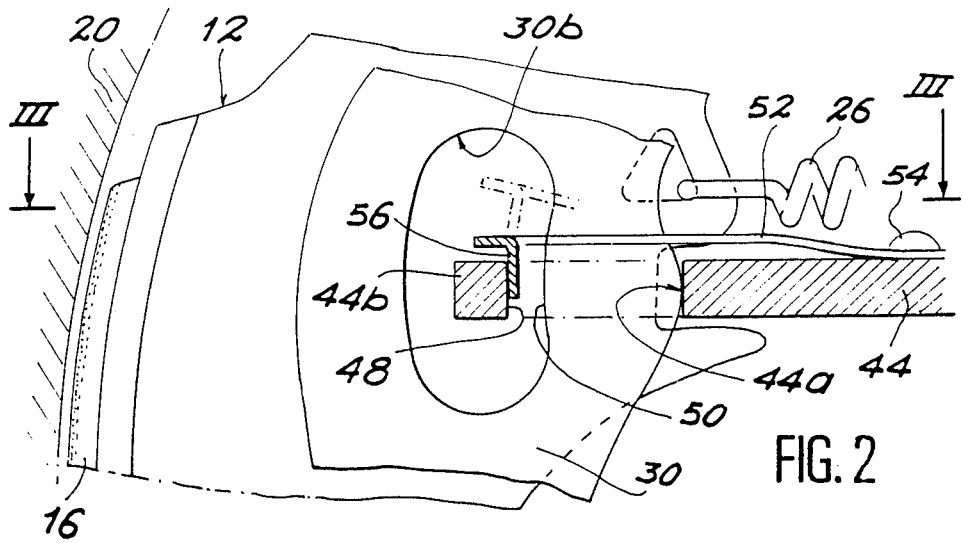
FIG. 2 is a plan view, on a larger scale and in partial section, showing the interaction of the spacer with the adjusting lever.
Figure 3:
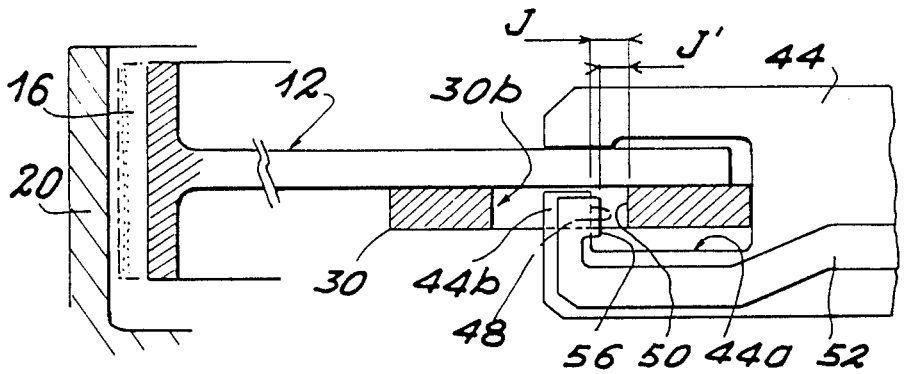
FIG. 3 is a sectional view according to line III—III of FIG. 2.

This movement, as FIGS. 2 and 3 show more precisely, has the effect of bringing together two surfaces opposite one another 48 and 50 formed respectively on the spacer 44 and on the adjusting lever 30. These two surfaces are normally separated by an operating clearance J determining the actuating travel of the motor 22 for which no brake adjustment at all is required, when the brake motor 22 is not actuated. This clearance J has been exaggerated purposely on FIGS. 2 and 3 to make it easier to understand.

In the example shown in these FIGURES, the surface 48 is formed on a lug 44b making a protrusion towards the inside of the notch 44a formed at the corresponding end of the spacer 44. This lug 44b enters a slot 30b made in the lever 30 and of which the edge closest to the inside of the brake defines the surface 50.

When the clearance J formed in the rest position between the surfaces opposite one another 48 and 50 is taken up during the implementation of the brake motor 22, the surface 48 of the spacer comes to rest against the surface 50 of the adjusting lever. If the distance existing at this moment between the ends of the brake shoes 12 and 14 actuated by the brake motor 22 is not sufficient to apply the brake linings 16 and 18 effectively against the rotating drum 20, the travel of the brake motor 22 continues, which has the effect of making the adjusting lever 30 pivot in an anti-clockwise direction when referring to FIG. 1. The space apart existing in the rest position between the ends of the brake shoes adjacent the brake motor 22 happens to be increased when this pivoting allows the ratchet 34 to advance by one tooth on the toothed sector 30a.

According to the invention, means are provided so that the clearance existing in the rest position between the surfaces opposite one another of the spacer 44 and of the adjusting lever 30 is greater when the temperature is high than when the temperature is near to ambient. An inadvertent increase in the distance in the rest position separating the ends of the brake shoes between which the brake motor 22 is located resulting in an expansion of the brake drum is thus avoided.

In the embodiment shown in FIGS. 2 and 3, these means comprise a bimetal strip 52 one end of which is fixed to the spacer 44, near its end adjacent to the leading brake shoe 12, for example by means of rivets 54. The opposite end of the bimetal strip 52 has a lug 56 considerably less in thickness than the clearance J, arranged so as to move into the space formed between the surfaces 48 and 50, against the surface 48, when the bimetal strip 52 is more or less flat. In this embodiment, the thickness of the lug 56 is uniform, such that the clearance J existing initially between the surfaces 40 and 50 becomes a reduced clearance J'. As an example which is in no way limiting, the clearances J and J' may be about 4 mm and 2.5 mm respectively.

The bimetal strip 52 is more or less flat (full outline in FIG. 2) at ambient temperature. The gradual distortion of the bimetal strip 52 under the influence of an increase in the temperature leads to the lug 56 moving completely away from between the surfaces 48 and 50 for a well-defined temperature threshold (chain-dotted lines in FIG. 2). As an example which is in no way limiting, this threshold may be in the region of 250° C.

The clearance J' is calculated so as to determine the actuating travel of the brake beyond which an adjustment of the distance separating the ends of the brake shoes on which the motor 22 acts is necessary, under normal temperature conditions.

On the other hand, the clearance J is determined in order that a brake adjustment occurs at high temperature only when the distance apart of the ends of the brake shoes adjacent to the brake motor reveals a wear of brake linings in addition to the expansion of the drum. An inadvertent adjustment due to overheating is thus avoided.

Figure 4:
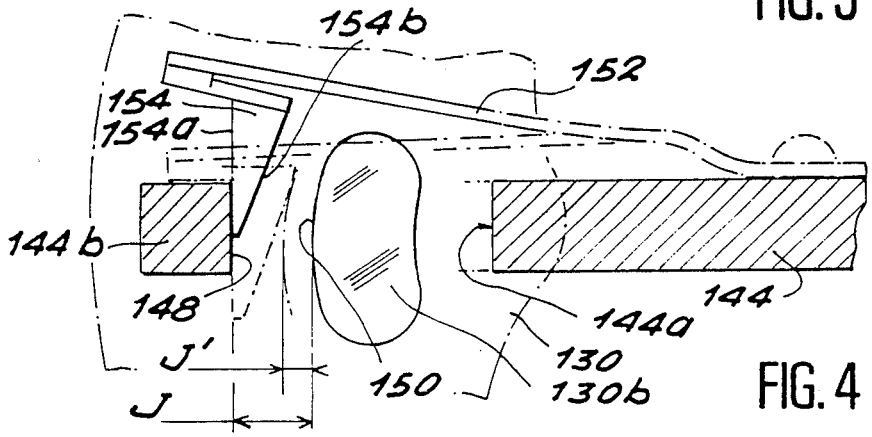
FIG. 4 is a view comparable to FIG. 2 showing another embodiment of the brake according to the invention.

In the embodiment shown in FIG. 4, the members corresponding to those which have been described earlier when referring to FIGS. 1 to 3 are indicated by the same reference numbers increased by 100. This embodiment differs particularly from the preceding one due to the fact that the lug 154 fixed at the end of the bimetal strip 152 has a variable thickness.

More precisely, this lug 154 presents an approximately triangular section defined between two flat intersecting faces 154a and 154b. As FIG. 4 shows, the bimetal strip 152 (chain-dotted) is virtually undistorted at ambient or slightly raised temperature. The face 154a of the lug is then next to the surface 148 formed on the spacer whereas the face 154b of the lug, which is opposite the surface 150 formed on the adjusting lever is inclined in relation to the latter.

Thus, as and when the bimetal strip 152 distorts under the influence of the increase in temperature (continuous line in FIG. 4) the clearance J' formed between the surface 150 and the lug 154 increases regularly with the temperature. In choosing the bimetal strip carefully and in giving an appropriate shape to the section of the lug 154, the operating clearance of the brake may thus be increased progressively beyond which an automatic adjustment of it is made, as and when the temperature increases, to compensate for the increase in diameter of drum 20 which arises from it. As earlier, the lug 154 moves completely away from between the surfaces 148 and 150 for a threshold of given temperature.

In another embodiment not shown, the small tongue on the bimetal strip may have a varying stepped thickness, in order that the operating clearance of the brake increases in stages with the temperature.

The embodiment of FIG. 4 also shows an alternative embodiment of the surfaces 148 and 150 formed on the spacer 144 and on the adjusting lever 130. More precisely, the surface 150 is formed on a projecting portion 130b of the adjusting lever 130, on the edge of this projecting portion nearest the brake drum. The opposite surface 148 formed on the spacer 144 is made for its part on a lug 144b being projected towards the adjusting lever inside the notch 144a formed at the corresponding end of the spacer.

Of course, the embodiments described earlier may undergo various modifications without deviating from the scope of the invention. In particular, the invention also applies to a drum brake with automatic adjustment in which the ratchet controlling the pivoting of the adjusting lever is replaced by any other system fulfilling the function of a unidirectional clutch. Moreover, the bimetal strip having the lug reducing the operating clearance at ambient temperature may be fitted on the adjusting lever instead of being mounted on the spacer and just take up its position against the abutment formed on it.

I claim:

1. A drum brake with automatic adjustment having a backplate on which two brake shoes are mounted slidably, comprising friction linings capable of being brought into friction engagement with a rotating drum by a brake motor inserted between two adjacent ends of the brake shoes, an adjusting lever one end of which is hinged on the end of a first of the brake shoes, a spacer inserted between the brake shoes near the brake motor, resilient means acting on the ends of the brake shoes toward the spacer so as to bring the adjusting lever to rest against the spacer when the brake motor is not actuated, to define a distance apart between the ends of the brake shoes in the rest position, unidirectional means of engagement mounted on the first brake shoe and coupled to the other end of the adjusting lever so as to permit a rotation of the adjusting lever only in a direction tending to increase the distance apart in a rest position, the spacer and adjusting lever having surfaces opposite one another separated by a space defining an operating clearance when the brake motor is not actuated, the surfaces being arranged so as to be able to come to rest one against the other to control the rotation of the adjusting lever in said direction when the motor is actuated, characterized in that a moving lug carried by a member sensitive to temperature is placed in the space to give a reduced value to the operating clearance when the temperature is less than a given temperature threshold, the member sensitive to temperature moving the lug out of the space when the temperature is more than said threshold in order to increase the operating clearance, the member sensitive to temperature being a bimetal strip fixed on the spacer by a first end and having the lug at another end.

2. The drum brake according to claim 1, characterized in that the moving lug has a uniform thickness such that the reduced value of the clearance is constant when the lug is disposed in the space.

3. The drum brake according to claim 1, characterized in that the moving lug has a varying thickness such that the operating clearance increases with the temperature.

4. The drum brake according to claim 3, characterized in that the thickness of the moving lug is defined between two flat intersecting faces, such that the operating clearance increases progressively with the temperature when above said threshold.

5. A drum brake with automatic adjustment having a backplate on which first and second brake shoes are mounted slidably, comprising friction linings capable of being brought into friction engagement with a rotating drum by a brake motor inserted between two adjacent first ends of the brake shoes, two adjacent second ends of the shoes held against an anchoring block fixed to said backplate, an adjusting lever one end of which is hinged on said first end of said first brake shoe, a spacer inserted between the brake shoes and moving with said second brake shoe, resilient means bringing said first ends of the brake shoes closer together so as to bring the adjusting lever to rest against said spacer in a rest position in order to define a distance apart between said first ends of the brake shoes in the rest position, unidirectional means of engagement mounted on said second end of said first brake shoe and coupled to the other end of the adjusting lever so as to permit a rotation of the adjusting lever only in a direction tending to increase said distance apart in the rest position, a protrusion formed at one end of said spacer entering a slot provided in said adjusting lever in order to determine surfaces opposite one another separated by a space defining an operating clearance when the brake motor is not actuated, the surfaces being arranged so as to be able to come to rest one against the other to control the rotation of the adjusting lever in said direction when the motor is actuated, characterized in that said drum brake further comprises a moving lug carried by a member sensitive to temperature and placed in said space in order to decrease said operating clearance when the temperature is lower than a given temperature threshold, and the lug moving out of said space in order to increase said operating clearance when the temperature is higher than the threshold.

6. A drum brake according to claim 5, wherein a first end of said member sensitive to temperature is fixed to the spacer and the other end fixed to said moving lug.

7. A drum brake according to claim 5, wherein said moving lug has a uniform thickness, said operating clearance having only two clearance values.

8. A drum brake according to claim 5, wherein said moving lug has a varying thickness in order to increase progressively said operating clearance with temperature changes.

9. A drum brake according to claim 8, wherein the thickness of the moving lug is defined by two intersecting faces.

* * * * *